United States Patent
Nokubi et al.

[11] Patent Number: 6,146,247
[45] Date of Patent: *Nov. 14, 2000

[54] METHOD AND APPARATUS FOR GRINDING THE SURFACE OF A WORK

[75] Inventors: Takashi Nokubi, Osaka; Haruo Kamei, Higashi Osaka, both of Japan

[73] Assignees: Kamei Tekkosho Ltd.; Replus Ltd, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,344

[22] Filed: Mar. 25, 1997

[30] Foreign Application Priority Data

Mar. 26, 1996 [JP] Japan ................................ 8-097657
Sep. 19, 1996 [JP] Japan ................................ 8-271417

[51] Int. Cl.[7] .................................................... B24C 1/04
[52] U.S. Cl. .......................... 451/40; 451/38; 451/55; 451/97
[58] Field of Search ................................ 451/28, 38, 39, 451/40, 36, 55, 75, 90, 95, 96, 97

[56] References Cited

U.S. PATENT DOCUMENTS

| | | | |
|---|---|---|---|
| 5,417,608 | 5/1995 | Elliott | 451/38 |
| 5,423,713 | 6/1995 | Mishima | 451/36 |
| 5,512,071 | 4/1996 | Yam et al. | 451/38 |

*Primary Examiner*—Eileen P. Morgan
*Attorney, Agent, or Firm*—Thompson Hine & Flory LLP

[57] ABSTRACT

Abrasive grains are produced by gluing an abrasive powder to an elastic porous carrier. A number of abrasive grains are mixed with an abrasive liquid, and are then sprayed to the surface of a work at an oblique angle thereto to impact it while allowing the abrasive grains to slide on the surface of a work to finish the surface of the work. Over the distance of travel over which the abrasive grains slide, the surface of the work are ground. The elasticity of the carrier allows the abrasive grains to deform matching the contour of the work. By spraying a number of abrasive grains on the work, grinding action is performed in consideration of the contour even if the work is a complicatedly contoured surface such as a dental prosthesis while a polishing effect is obtained at the same time.

11 Claims, 7 Drawing Sheets

METHOD AND APPARATUS FOR GRINDING THE SURFACE OF A WORK

BACKGROUND OF THE INVENTION

1. Field of the Invention

The present invention relates to a method and apparatus for grinding the surface of a work which is made of a metal, a ceramic, a plastic or a composite material of some of these, and in particular to a method and apparatus for semi-finishing and polishing the surface of a work having a complicated irregular contour.

2. Description of the Prior Art

To adapt a dental prosthesis in the oral cavity of a patient for a long-term service, the configuration of the oral cavity of the patient has to be accurately reproduced and the dental prosthesis has to be precisely and smoothly finished. Since a dental prosthesis having a complex contour is produced by composting a metal, a ceramic and a resin, polishing the surface of the dental prosthesis is time consuming. For example, when a dental prosthesis is made of a metal and a ceramic, a typical process is as follows: at roughing steps, a mold material and an oxidized layer are removed using a roughest sandpaper, a sprue line is removed using a grinder, and the dental prosthesis is shaped using carborundum points, diamond points, carbide burs, a heatless stone and the like; and at semi-finishing steps, the dental prosthesis is polished using silicon points and sand, polished by a rotary brush loaded with an abrasive driven by a hand-held engine or lathe, and finally buffed as a mirror surface. When a dental prosthesis is made of a resin, unwanted parts such as burrs are cut using a stamp bar, the dental prosthesis is polished using paper corn or abrasive sand at a semi-finishing step, and then finally buffed. To complete the production of a dental prosthesis, a substantial time is consumed for grinding and polishing steps after molding. Throughout the above steps, particularly from semi-finishing to buffing, tips in a diversity of shapes including particulate shapes are available to adapt to a work of a prosthesis having a complex contour, and depending on the contour, these are selectively used to produce a smooth surface.

Since such a tip loaded on a high-speed lathe performs a spot polishing, time and energy are required to process uniformly the dental prosthesis on its overall area. Fine adjustment should be exercised in mounting the dental prosthesis and exertion of force on the tip. From the standpoint of environmental conditions, a great deal of abrasive powder, which is generated during the process, is likely to pose health problems to technicians who are exposed to such powder.

Not only in the above dental laboratory applications but in other applications, grinding and polishing processes are generally characterized by poor workability and poor working conditions, which remain to be solved.

SUMMARY OF THE INVENTION

It is an object of the present invention to provide a method and apparatus for grinding the surface of a work in which grinding and polishing processes are completed in a short period of time even if the surface of the work has an irregular surface and a good environmental condition is maintained.

To achieve the above object, abrasive grains are produced by gluing abrasive powder to be used for grinding to a porous carrier. A great deal of such abrasive grains are mixed with a grinding liquid, and then sprayed onto the surface of the work at an oblique angle thereto. After allowing the abrasive grain to impact on the surface of the work, the carrier is plastically deformed while the abrasive grain is slid on the surface of the work, so that the abrasive grain mixed with the carrier finishes the surface of the work.

By using a relatively soft porous body as the carrier, the abrasive grain is slid on the surface of the work taking advantage of lubricating action of the grinding liquid while the carrier, when impacted on the surface of the work, is plastically deformed. Over the distance of travel of the abrasive grain, it smoothly finishes the surface of the work. The elasticity of the carrier allows the abrasive grain to deform to match the shape of the surface of the work when it impacts on the surface of the work. By spraying a number of abrasive grains, a work is ground to its desired contour while the carrier provides a polishing effect to the work even if the work has a complicatedly contoured surface such as a dental prosthesis. Since the elasticity of the carrier weakens the impact of the abrasive grain against the surface of the work, the work is free from a satin finish which would result from a shot blast. Specifically, the carrier is derived from vegetable fibers. Abrasive grains are produced by allowing the fat or sugar of the fibers to be used as a glue when the abrasive powder is glued to the carrier. The carrier is not limited to such a natural substance as vegetable fibers. An abrasive grain may be produced by mixing an elastic and porous synthetic resin like a sponge with an adequate glue or adhesive to allow abrasive powder to glue thereto. The adequate glue or adhesive may be natural or synthetic one. As a natural glue, fat and sugar may be used. As a synthetic glue, a synthetic resin glue may be used. The present invention is not limited to these carriers. Other materials may also be employed as long as they are porous.

A grinding apparatus of the present invention comprises: a work chamber having an abrasive grain container below a workbench for supporting a work; an abrasive spraying unit comprising a impeller having two rotatable disks which clamp a plurality impeller blades therebetween, wherein the open circumferences of the impeller are partly closed by a belt where the belt is wrapped around the impeller; and a feeder for feeding, into the impeller, abrasive grains from the container via an input port arranged in one of the disks. By rotating the impeller, a centrifugal force is imparted to the abrasive grains, and the abrasive grains are sprayed to the work at an oblique angle thereto, in a tangential direction of the impeller at the point where the belt parts from the circumference of the impeller.

In this arrangement, the impeller blades are radially gradually opened to the outer circumference of the impeller in a generally triangular configuration in cross section, and the spacing between the impeller blades around the circumference of the impeller is narrower.

The work chamber is provided with an observation window to allow a technician to monitor the progress of grinding process, and a manipulator is employed instead of the workbench, or a glove compartment is arranged on the wall of the work chamber to assure the safety of the technician. By the manipulator is meant mechanical means that allows the technician to modify the orientation of the work as necessary. By the glove compartment is meant built-in gloves in the work chamber. Wearing these gloves, the technician manipulates the work in the work chamber.

In the grinding apparatus, the feeder comprises a train of plurality of trays arranged in a stepwise fashion across the width of the endless belt and a plurality of trains are arranged at equal intervals along the direction of advance of the endless belt. In this arrangement, the abrasive grains are continuously supplied to the abrasive spraying unit.

A pressure air feed nozzle that is open in the direction of the abrasive grain spraying is arranged in parallel with a spray nozzle for the abrasive grains. In this arrangement, particularly when a work has a recess on its surface, abrasive grains lodged in the recess are quickly removed by applying pressure air.

A pressure air supply unit is internally connected to the spray nozzle that is open in the direction of spraying of the abrasive grain. A flexible tube is connected to the spray nozzle. The other end of the flexible tube is connected to a hand-held nozzle. In this arrangement, a grinding operation is performed at an arbitrary point on the surface of the work using the flexible tube. Using the hand-held version of nozzle, the position to be ground on the surface of the work is determined and furthermore the work is ground at an arbitrary angle thereto.

These and other objects, organization and advantages of the present invention will be more fully understood from the following description of the invention and the drawings.

DESCRIPTION OF THE PREFERRED EMBODIMENTS

Figure 1:
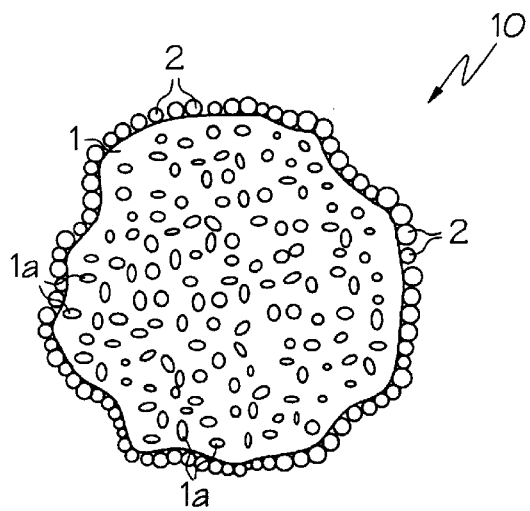
FIG. 1 is a conceptional view showing diagrammatically an abrasive grain of the present invention.
Figure 2A:
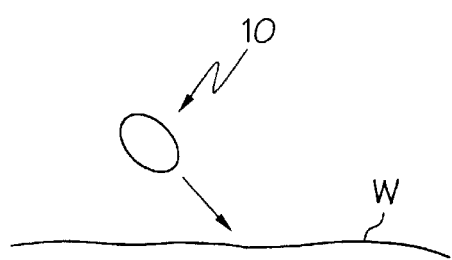
FIG. 2 is a conceptional view showing diagrammatically grinding steps according to the present invention.
Figure 2B:
Figure 2C:
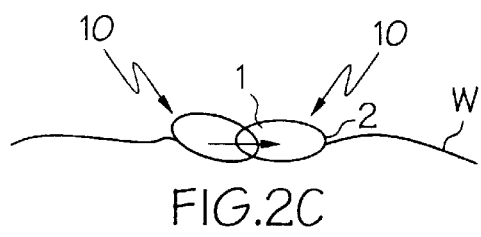
Figure 2D:
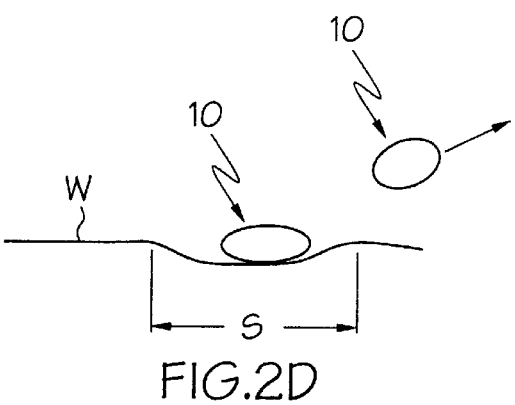

Referring now to the drawings, the embodiments of the present invention are discussed.

FIG. 1 shows an abrasive grain 10 used in the grinding method of the present invention. The abrasive grain 10 is constructed of an elastic carrier 1 porous with a great deal of pores 1a and abrasive powder 2 glued to the carrier 1. The carrier 1 is preferably soft and plastic, and furthermore preferably light-weighted. Specifically, the carrier 1 is made of natural fibers such as vegetable fibers. In this embodiment, the particle size of each carrier 1 is as large as 0.1 through 10 mm. The abrasive powder 2 is selected from an abrasive material in consideration of the material of a work to be ground. Specifically, when a work to be ground is a metal, silicon carbide or alumina is used, when a work to be ground is a ceramic, a diamond is used, and when a work to be ground is a plastic, an alumina or iron oxide is used. Each material is atomized into particles having a particle size of 1 to 20 μm. When the carrier 1 is made of vegetable fibers, their fat or sugar may be used as a glue to cause the abrasive powder 2 to glue to the carrier 1. The carrier is not limited to such a natural substance as vegetable fibers. An abrasive grain may be produced by mixing an elastic and porous synthetic resin like a sponge with an adequate glue or adhesive to allow abrasive powder to glue thereto. The adequate glue or adhesive may be natural or synthetic one. As a natural glue, fat and sugar may be used. As a synthetic glue, a synthetic resin glue may be used.

The abrasive grain 10 is exposed to wind or heat to dry the surface of the carrier 1 and thus to weaken glue-ability of the sugar or the like so that old abrasive powder 2 is peeled off the surface of the carrier 1. In this way, the abrasive grain 10 is prevented from clogging with polish remnants. Furthermore, allowing the abrasive grain 10, of which glue-ability is reduced by drying, to absorb moisture, glue-ability of the sugar or the like is recovered, and a new abrasive powder 2 may be glued onto the surface of the carrier 1 again. Namely, the carrier 1 is recyclable.

Referring to FIG. 2, the grinding steps of the surface of the work by the abrasive grain 10 are discussed. First, the abrasive grain 10 mixed with a grinding liquid is sprayed onto the work surface W at an angle oblique thereto (FIG. 2A). The abrasive grain 10 is plastically deformed when it impacts on the work surface W and starts grinding the work surface W (FIG. 2B). In succession, the abrasive grain 10 slides along the work surface W with its lubricating action, and thus the work surface W is ground by the distance of travel S of the abrasive grain 10 (FIG. 2C). The abrasive grain 10 is repelled by the work surface W and the grinding process ends (FIG. 2D).

Figure 3A:
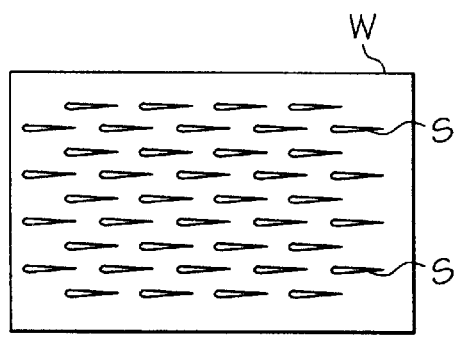
FIG. 3 is a conceptional view showing the ground traces of the surface of a work to compare the grinding method of the present invention and the grinding method of the prior art.
Figure 3B:
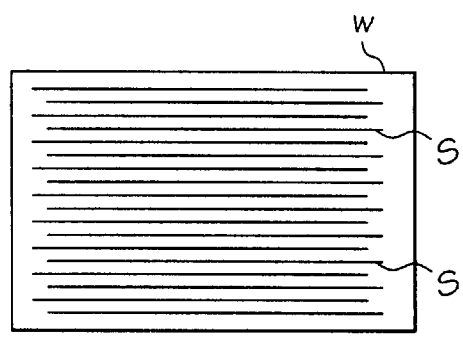
Figure 3C:
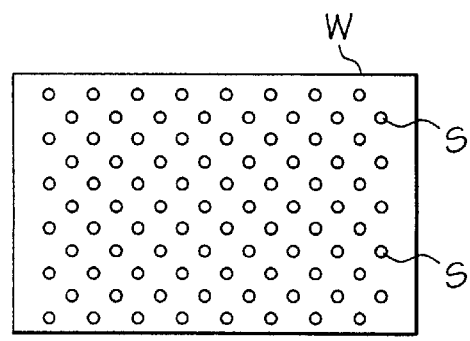

FIG. 3 shows ground traces S on the work surfaces to compare the grinding method of the present invention with the prior art grinding method. As shown in FIG. 3A, according to the present invention, elongated sharply ground traces S oriented in the direction of spraying of the abrasive grain 10 (from left to right in FIG. 3A) are created. A likely cause of these traces is as follows: kinetic energy of the abrasive grain 10 is at a maximum when it impacts on the work surface W, and is consumed as it slides along the work surface W; as friction between the abrasive grain 10 and the work surface W weakens, namely the grinding power of the grinding powder 2 weakens, the abrasive grain 10 starts being repelled from the work surface W by elasticity of the carrier 1. In contrast, when a sandpaper method of the prior art is used, ground traces S having a certain length in the direction of the grinding and a certain thickness are created (FIG. 3B). When a shot blast method is used, numerous fine dents are created on the work surface W and form a satin finish (FIG. 3C). As understood from these figures, the ground traces S created according to the grinding method of this invention have middle forms between sandpaper ground traces and shot blast ground traces. In this invention, a certain amount of the abrasive grain 10 sprayed onto the work surface for a predetermined duration of time results in a surface finish as smooth and fine as that obtained from the sandpaper method.

According to the grinding method of this invention, by adjusting the amount of spray of the abrasive grain 10 per unit time, a resulting surface finish is almost as good as that obtained through sandpaper grinding. In practice, the spraying speed of the abrasive grain 10 is adjusted in accordance with the material of the work. For example, when the work surface is of a soft or brittle material, the spraying speed of the abrasive grain 10 may be lowered to grind the work surface at an excellent surface finish. By adjusting the spraying speed of the abrasive grain 10, kinetic energy of the abrasive grain 10 is adjusted, friction with the work surface of the abrasive grain 10, namely the grinding power of the abrasive powder 2 is adjusted as well. Depending on the contour of the work, pressure air may be concurrently applied along with the spraying of the abrasive grain 10. For example, when a recess exists on the work surface, the abrasive grain 10 is lodged in the recess, thus the recess is covered with the abrasive grain 10. This can lower grinding efficiency. Since the specific gravity of the abrasive grain 10 is low, the abrasive grain 10 lodged in the recess is quickly removed by applying pressure air to the recess while the abrasive grain 10 is sprayed. Thus, the grinding efficiency is increased. Adjusting properly the quantity and speed of the abrasive grain 10 and applying pressure air to the work surface while the abrasive grain 10 is sprayed fall within the scope of the present invention.

Figure 4:
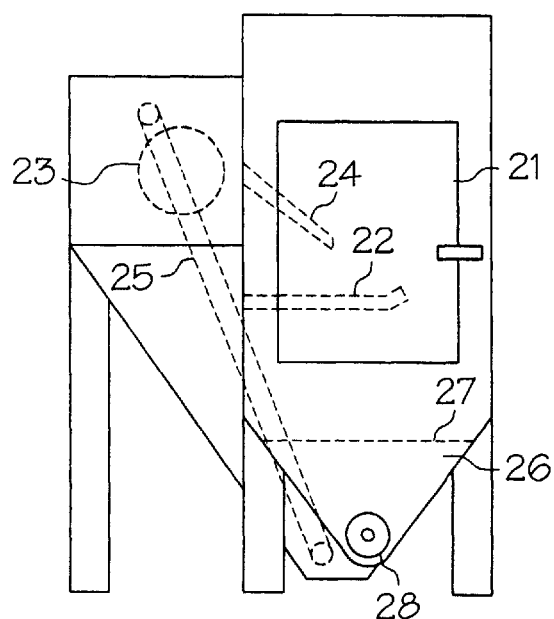
FIG. 4 is a side view showing a first embodiment of the grinding apparatus of the present invention.

Referring to FIG. 4, the grinding apparatus of the present invention is now discussed. One embodiment of the grinding apparatus 20 in FIG. 4 comprises a work chamber 21, a workbench 22 for supporting a work in the work chamber 21 or a manipulator 22 remotely controlled, a spraying unit 23 for spraying abrasive grains to the workbench 22 at an oblique angle thereto, a spray nozzle 24, a feeder 25 for supplying the abrasive grains to the spraying unit 23 from the container 26 arranged below the workbench 22, a wire gauze 27, and an impeller 28 for delivering the abrasive grains to a feeder 25 from a container 26. The abrasive grains sprayed by the spraying unit 23 impact on the work surface, then fall into the container 26, and then recirculated to the spraying unit 23 delivered by the feeder 25.

Figure 5:
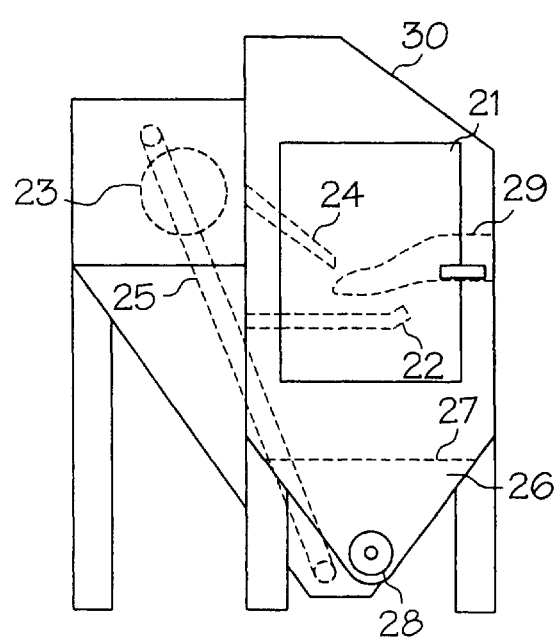
FIG. 5 is a side view showing another embodiment of the grinding apparatus of the present invention.

FIG. 5 shows another embodiment of the grinding apparatus 20. In this embodiment, the work chamber 21 is provided with a glove compartment 29 and an observation window 30. A technician may manipulate the work, for example, modify the orientation of the work placed on the workbench 22 using gloves in the glove compartment while monitoring the progress of grinding process through the observation window 30.

Figure 6:
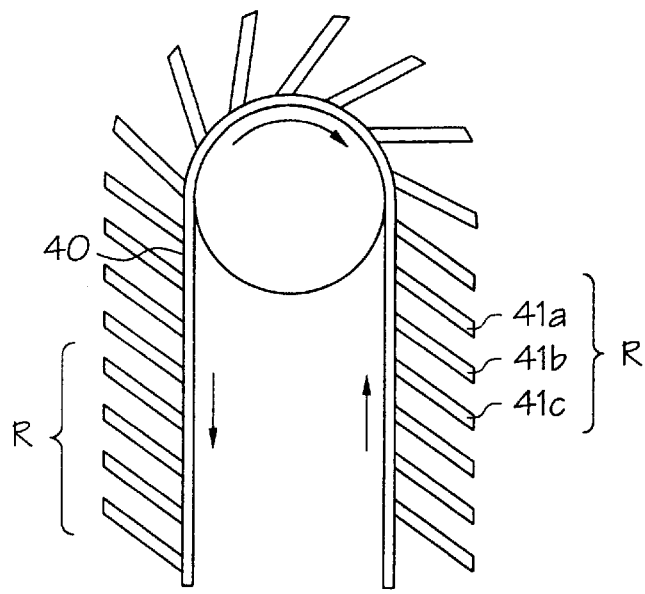
FIG. 6 is a side view showing one embodiment of a feeder.
Figure 7:
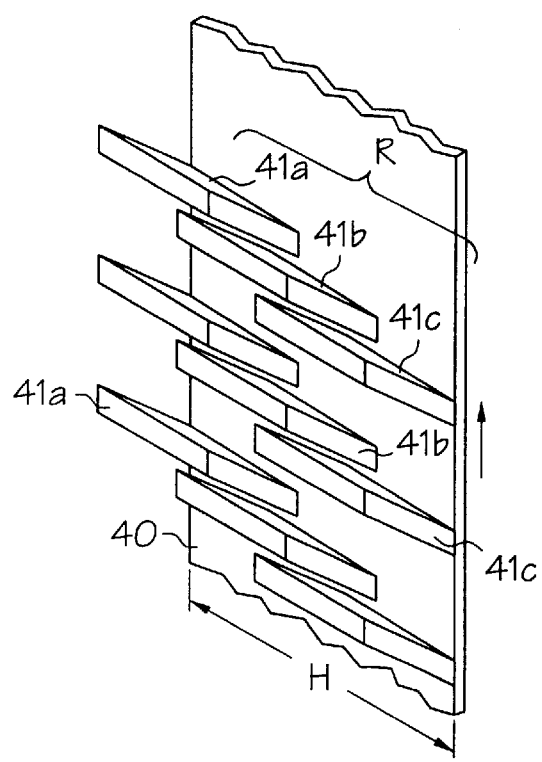
FIG. 7 is a perspective view of the feeder.

The feeder 25 in the grinding apparatus may be a belt conveyor or screw conveyer. A belt conveyor, if employed, preferably has a construction that permits a continuous supply of the abrasive grains 10. More specifically, as shown in FIGS. 6 and 7, a train R of three trays 41a, 41b and 42c are obliquely downward arranged in a stepwise fashion across the width H of an endless belt 40. A plurality of trains R are arranged and equally spaced along the direction of advance (as indicated by arrows) of the endless belt 40 to constitute the feeder 25. At the moment any given train R ends the supply of the abrasive grains, a next train R starts supplying the abrasive grains in succession, and thus the spraying unit 23 is substantially continuously provided with the abrasive grains. By adjusting the rotational speed of the endless belt, the supply rate of the abrasive grains is adjusted. Furthermore, by narrowing the intervals between the trains R, a more continuous supply of the abrasive grains is possible. The belt conveyor is not limited to a three-tray structure. For example, a four-tray structure is also acceptable.

Figure 8:
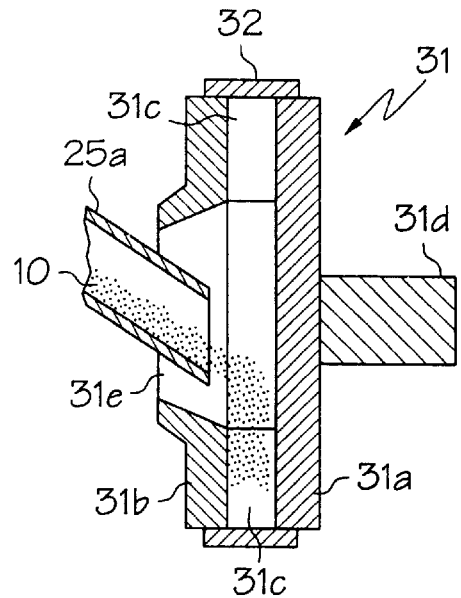
FIG. 8 is a longitudinal sectional view of one embodiment of a spraying unit.
Figure 9:
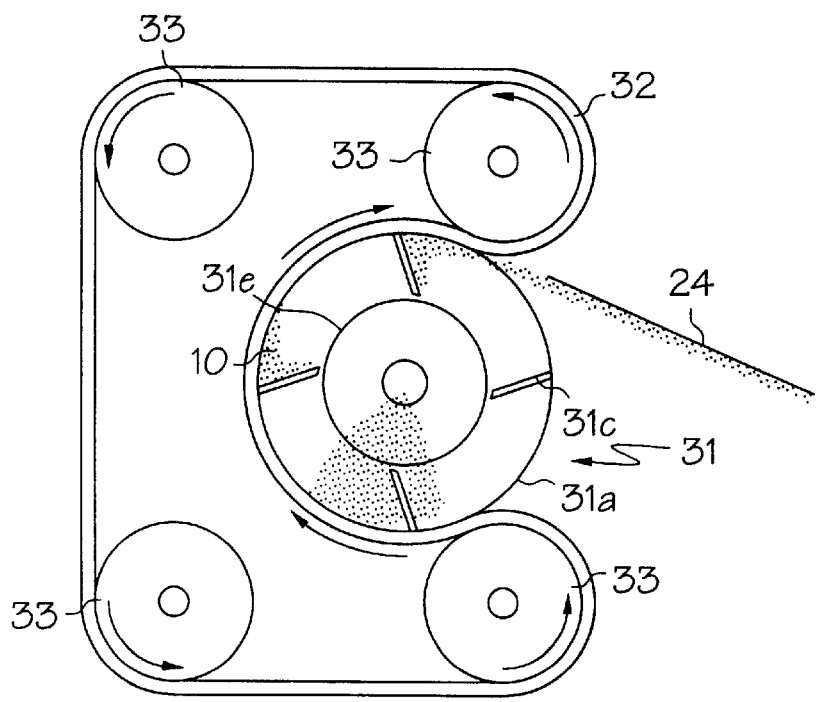
FIG. 9 is a side view of the spraying unit.
Figure 10:
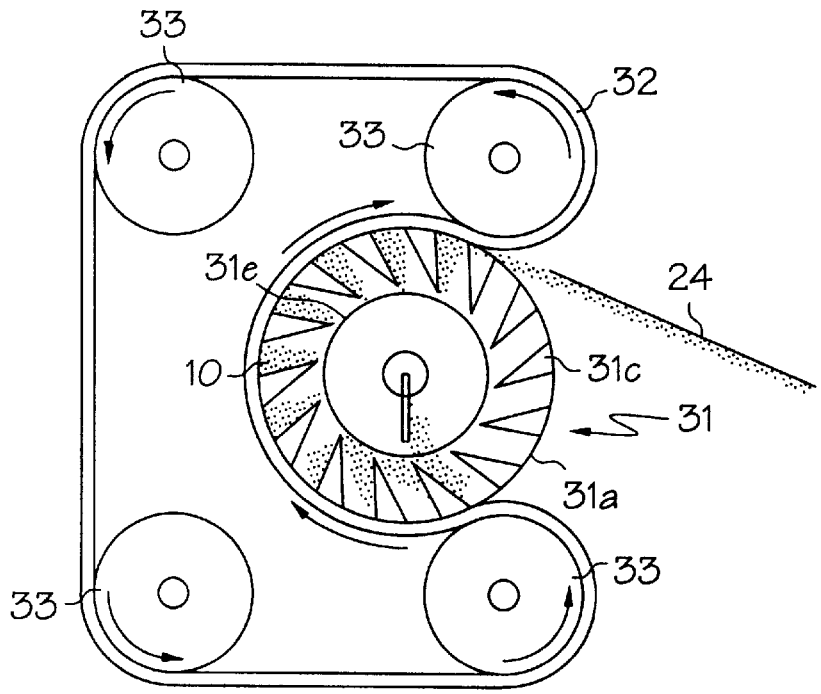
FIG. 10 is a side view showing another embodiment of the spraying unit.

Referring to FIGS. 8 and 9, the construction of the spraying unit 23 is discussed more in detail. The spraying unit 23 comprises an impeller 31 having two circular disks 31a and 31b that clamp a plurality of impeller blades 31c therebetween, with part of the circumference of the impeller 31 between the impeller blades 31c opened while the remaining circumference of the impeller 31 is closed by a belt 32 that is partly wrapped around the impeller 31. The impeller blades 31c are inclined downwardly in the direction of rotation (as indicated by arrows in FIG. 9). A driving shaft 31d attached to one disk 31a rotates the impeller 31. The other disk 31b has an input port 31e, through which the abrasive grains 10 are introduced into the impeller 31 via a supply tube 25a of the feeder 25. Pulleys 33 rotate the belt 32 and the impeller 31 in synchronization.

In the spraying unit 23, the abrasive grains 10 introduced into the impeller 31 through the input port 31e are gradually shifted to the circumference of the impeller 31 by means of wind pressure and centrifugal force, roll on the belt 32 while being in contact therewith, and are sprayed out in the tangential direction at the point where the belt 32 parts from the circumference of the impeller 31.

The impeller blades 31c is planar as described above. Alternatively, each impeller blade 31c may have a generally triangular configuration in cross section that is opened toward the circumference of the impeller 31. In this case, the intervals between the blades 31c are narrower on the circumference of the impeller 31, and the distance of travel over which the abrasive grains 10 roll on the belt 31 while being in contact therewith is short. This arrangement, therefore, reduces wear of the belt 31 by the abrasive grains 10. Furthermore, in this arrangement, a negative pressure is generated inside the impeller 31, and the abrasive grains 10 are efficiently drawn toward the belt 32.

In the above embodiments, the abrasive grains 10 are obliquely downwardly sprayed from the impeller 31. Alternatively, the impeller blades 31c may be radially arranged so that the abrasive grains 10 are sprayed diagonally upwardly by rotating the impeller 31 in reverse direction. Namely, by allowing the impeller 31 in one of two directions as appropriate, the work surface may be ground at a different angle without moving the work itself.

Figure 11:
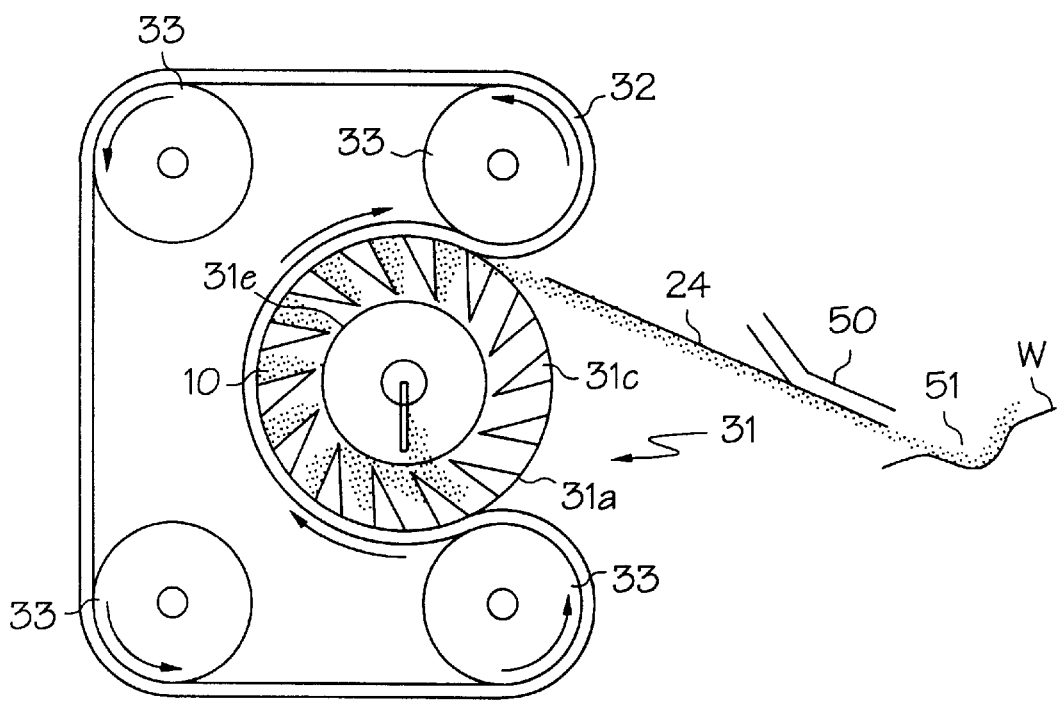
FIG. 11 is a side view showing a second embodiment of the spraying unit.

FIG. 11 shows a second embodiment of the spraying unit 23 in the grinding apparatus of the present invention. A pressure air nozzle 50 is arranged in the direction of spraying, in parallel with the spray nozzle 24. In this arrangement, if there exists a recess 51 in the work surface W, the abrasive grains 10 lodged in the recess 51 are dispersed outward by applying pressure air onto the work surface W and thereby the efficiency of grinding process is heightened.

Figure 12:
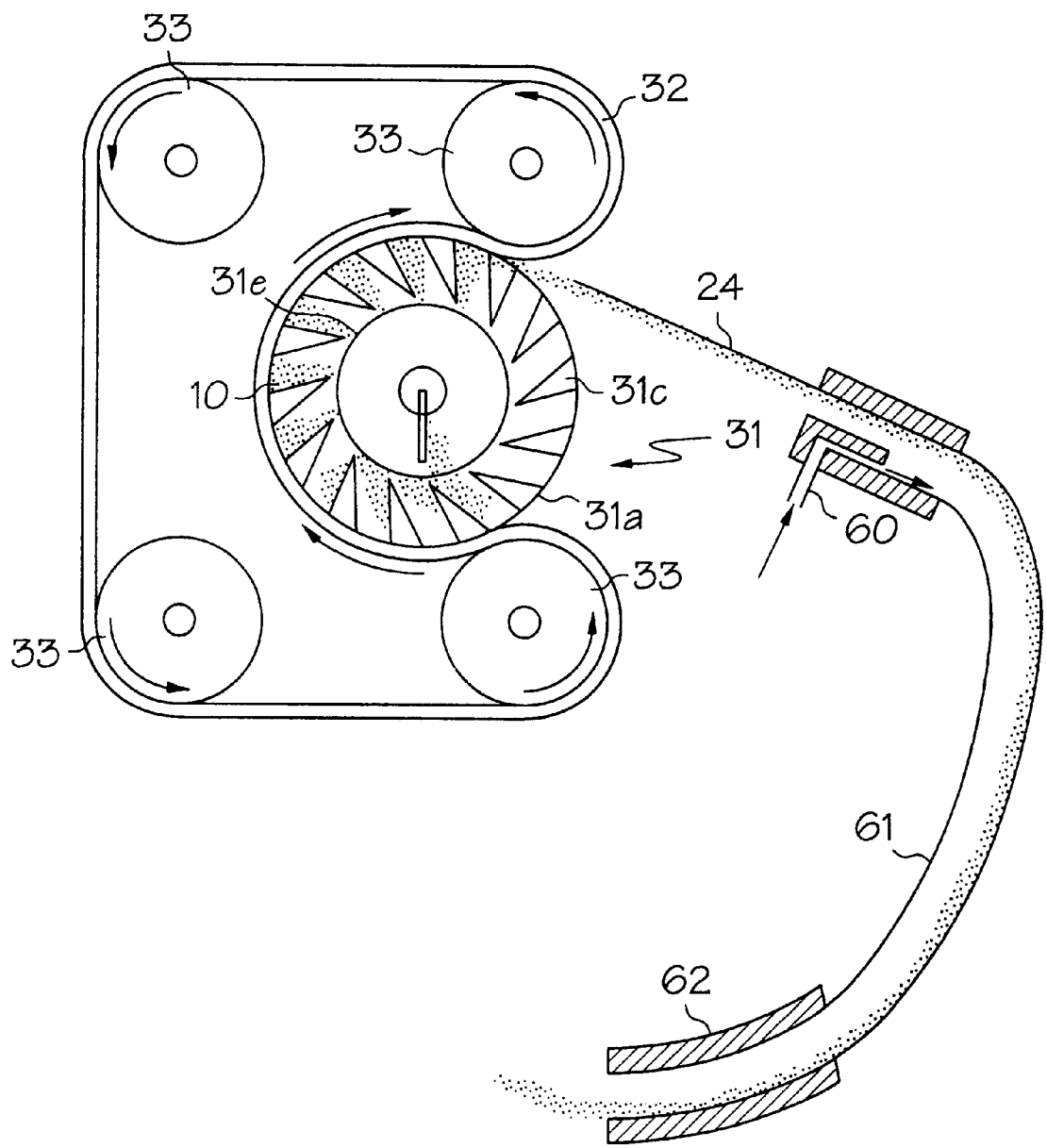
FIG. 12 is a side view showing a third embodiment of the spraying unit.

FIG. 12 shows a third embodiment of the spraying unit 23 in the grinding apparatus of the present invention. A pressure air supply unit 60 that is opened in the direction of spraying of the abrasive grains 10 is internally connected to the spray nozzle 24. A flexible tube 61 is connected to the spray nozzle 24 at its one end and connected to another nozzle 62 at the other end that works as a hand-held unit. In this arrangement, the work is ground at any position as long as the length of the tube 61 permits. With the nozzle 62 in one hand, the abrasive grains 10 are sprayed to the work surface W at an intended angle focusing on a particular position by changing the direction of the nozzle. Since the abrasive grains 10 can be accelerated by pressure air within the tube 61, the abrasive grains 10 are sprayed without any deceleration of the spray speed at the spray nozzle 24. By allowing the tube 61 to curve as intended, the spray speed of the abrasive grains 10 delivered from the nozzle 62 is adjusted and the spray rate of the abrasive grains 10 is adjusted. Grinding process is thus carried out in consideration of the material of the work surface W.

What is claimed is:

1. A grinding method for grinding the surface of work with an abrasive powder comprising the steps of:

a) producing abrasive grains by glueing abrasive powder to elastic porous carriers;

b) mixing the abrasive grains with an abrasive liquid;

c) spraying, to the surface of a work at an angle oblique thereto, the mixture of abrasive gains and abrasive liquid to impact on the surface of the work, and causing the abrasive grains to slide on the surface of the work while the abrasive grains are allowed to deform.

2. A grinding method for grinding the surface of a work according to claim 1, wherein the carrier is made of vegetable fibers, and fat or sugar contained in the vegetable fibers serves as a glue to glue the abrasive powder to the carrier.

3. A grinding method for grinding the surface of a work according to claim 1, wherein the carrier is made of an elastic porous synthetic resin and the abrasive grains are produced by gluing the abrasive powder to the elastic porous synthetic resin.

4. A grinding method for grinding the surface of a work with an abrasive powder comprising the steps of:

providing abrasive grains comprising an abrasive powder glued on an elastic porous carrier;

mixing the abrasive grains with an abrasive liquid;

spraying the mixture of abrasive grains and abrasive liquid to the surface of a work at an angle oblique thereto;

impacting the surface of the work; and grinding the surface of the work as the abrasive grains are allowed to deform.

5. A grinding method for grinding the surface of a work according to claim 4, wherein the carrier comprises vegetable fibers, and fat or sugar contained in the vegetable fiber serves as a glue to glue the abrasive powder to the carrier.

6. A grinding method for grinding the surface of a work according to claim 4, wherein the carrier is made of an elastic porous synthetic resin and the abrasive grains are produced by gluing the abrasive powder to the elastic porous synthetic resin.

7. A grinding method for grinding the surface of a work according to claim 4, wherein the abrasive powder is selected from the group consisting of silicone carbide, alumina, diamond and iron oxide.

8. A grinding method for grinding the surface of a work according to claim 4, wherein the particle size of the abrasive powder ranges from about 1–20 mm.

9. A grinding method for grinding the surface of a work according to claim 4, wherein the particle size of the carrier ranges from about 0.1 to 10 $\mu$m.

10. A grinding method for grinding the surface of a work in accordance with claim 4, wherein the surface of a work comprises a material selected from the group consisting of metal, ceramic, plastic and combinations thereof.

11. A grinding method for grinding the surface of a work in accordance with claim 4, wherein the work comprises a dental prosthesis.

\* \* \* \* \*